United States Patent [19]

Lidwell

[11] Patent Number: 5,726,814
[45] Date of Patent: Mar. 10, 1998

[54] MULTIPLE FIELD OF VIEW CHANGING APPARATUS FOR AN OPTICAL SYSTEM

[75] Inventor: Michael Owen Lidwell, Glasgow, United Kingdom

[73] Assignee: Barr & Stroud Limited, Glasgow, United Kingdom

[21] Appl. No.: 563,280

[22] Filed: Nov. 22, 1995

[30] Foreign Application Priority Data

Nov. 26, 1994 [GB] United Kingdom ............... 9423933

[51] Int. Cl.$^6$ ............................... G02B 7/02; G02B 23/00
[52] U.S. Cl. ........................................... 359/821; 359/421
[58] Field of Search .................................. 359/381, 384, 359/421, 672, 821

[56] References Cited

U.S. PATENT DOCUMENTS

| | | |
|---|---|---|
| 1,236,722 | 8/1917 | Lange .................................... 359/421 |
| 2,552,940 | 5/1951 | Cornut ................................... 359/421 |
| 4,195,903 | 4/1980 | Kawase et al. ........................ 350/36 |
| 4,961,636 | 10/1990 | Gaul et al. ............................ 350/520 |
| 5,515,206 | 5/1996 | Peng ...................................... 359/721 |
| 5,528,416 | 6/1996 | Hartmann ............................. 359/381 |

*Primary Examiner*—Paul M. Dzierzynski
*Assistant Examiner*—Mark Robison
*Attorney, Agent, or Firm*—The Bell Seltzer Intellectual Property Law Group Alston & Bird LLP

[57] ABSTRACT

A three field of view change apparatus has a cubic carousel 1 mounted for rotation about a rotation axis 2 which is coincident with a diagonal of the carousel 1. The rotation axis 2 makes an angle of 54.736° with a fixed optical axis 5 so that carousel 1 can be rotated to cause the fixed optical axis 5 to pass through the centres of any two opposed faces of the carousel 1. Optical components 14 are arranged on opposed faces of the carousel 1 and can be swung into alignment with the optical axis by rotating the carousel.

2 Claims, 6 Drawing Sheets

MULTIPLE FIELD OF VIEW CHANGING APPARATUS FOR AN OPTICAL SYSTEM

The present invention relates to a multiple field of view change apparatus and in particular, though not necessarily, to optical telescopes having interchangeable lens mechanisms which enable the degree of magnification and the width of the field of view to be varied.

Many optical telescopes are required to operate with variable magnification to provide interchange between a low magnification, wide field of view mode and a high magnification, narrow field of view, mode. A convenient way of achieving this aim is to maintain the objective and eyepiece lenses fixed relative to one another and to achieve the change of setting by the motion of intermediate lenses. In the case of zoom telescopes, an intermediate lens element is moved along the optical axis of the telescope to achieve optical zoom. However, this type of arrangement is unsatisfactory for stablised telescopes, for example thermal imaging telescopes designed to fit inside a stabilized head, mounted on gymbals, as movement of the intermediate lens causes the centre of gravity to shift, giving rise to imbalances. In addition, the system tends to become too long when corrections are made for optical aberrations. Furthermore, it is difficult to perform sliding motions quickly whilst maintaining accurate centering of the intermediate lens with respect to the optical axis.

In order to overcome the above described disadvantages, lens systems have been developed which make use of balanced rotary mechanisms which allow different lenses to be swung into line with the optical axis. One such field change system is the teleconvertor, or Gallelian, telescope which may be swung into the afocal space in front of the main telescope. This arrangement is, however, unsatisfactory in certain circumstances as the teleconvertor is not placed intermediate between the objective and the eyepiece lenses and thus the telescope is lengthened.

An improved telescope makes use of what is known as a "Bravais lens" which has its object and image coincident at the Bravais point. A dual field of view telescope using a Bravais lens arrangement has the arrangement mounted for rotation about an axis perpendicular to the optical axis and at an intermediate position between the eyepiece and objective lenses.

Multiple fields of view telescopes may be achieved by cascading Bravais lens, or other lens system, arrangements. However, such systems are not particularly compact and require complex and bulky motors and/or gearings.

It is an object of the present invention to overcome or at least mitigate certain of the disadvantages of prior art multiple field of view telescopes. In particular, it is an object of the present invention to provide a compact triple field of view telescope.

According to a first aspect of the present invention there is provided a multiple field of view change apparatus for use in an optical system having an optical axis, the apparatus comprising a carousel arranged to be rotatable about a rotation axis which is at an angle to the optical axis of other than 0 or 90 degrees, and a plurality of optical components mounted on the carousel and aligned with ones of a plurality of carousel axes, the carousel axes passing through respective opposed pairs of faces of a platonic shape, wherein the carousel can be rotated about the rotation axis to substantially align any one of the carousel axes with said optical axis.

Platonic shapes for the purposes of the above apparatus comprise cubes, octahedrons, dodecahedrons. Whilst these shapes may be regular, it is envisaged that regularity is not essential and distortions of angle or scale are possible whilst maintaining the same basic topology.

Preferably, the angle which the rotation axis makes with the optical axis is greater than 10°, and more preferably greater than 40°, to enable positioning of motors and gears for rotating the carousel such that they do not interfere with the optics.

In a preferred embodiment of the present invention, the optical components are mounted on the faces of a cube, the centre of which cube is located at the origin of three orthogonal axes. Preferably, the rotation axis of the carousel is colinear with a diagonal of the cube, i.e. makes an angle of 54.7° with the optical axis, so that ones of the orthogonal axes may be swung into alignment with the optical axis by successive rotations of 120°.

Optical components which are fixed relative to the optical axis may be contained within the carousel so that the carousel can be rotated about them. Where the carousel is rotatably attached to an axle, these fixed optical components may be fixed to the axle.

The optical components of the present invention may be lenses or other devices such as polarizing filters, mirrors, holograms, etc.

The change apparatus may be designed to work over any appropriate part of the electromagnetic spectrum, e.g. visible or infra-red.

One embodiment of the present invention provides a three field of view change apparatus for use in an optical system having an optical axis, the apparatus comprising a carousel arranged to be rotatable about a rotation axis which is at an angle to the optical axis of other than 0 or 90 degrees, and a plurality of optical components mounted on the carousel and aligned with ones of three substantially orthogonal axes, wherein the carousel can be rotated about the rotation axis to substantially align any one of the three orthogonal axes with the optical axis.

A second embodiment of the present invention provides an optical telescope comprising an eyepiece lens and an objective lens aligned with an optical axis and a triple field of view change apparatus according to the above first aspect of the present invention occupying an intermediate position between the eyepiece lens and the objective lens, wherein said optical components comprise at least two pairs of optical lenses, each pair being aligned with a different one of the orthogonal axes and providing a different field of view.

A third embodiment of the present invention provides a multiple field of view change apparatus for use in an optical system having an optical axis, the apparatus comprising a multifaced carousel arranged to be rotatable about a rotation axis which is at an angle to the optical axis of other than 0 or 90 degrees, and at least two pairs of optical components each of which components is mounted on a corresponding face of the carousel for rotation therewith, wherein the optical components of each pair define an optical path therebetween which can be aligned with the optical axis by rotation of the carousel about the optical axis and wherein the at least two optical paths intersect one another.

The carousel may have any regular platonic shape, e.g. a cube, an octahedron or a dodecahedron. The rotation axis may pass through the centres of opposed faces of the carousel or may pass through opposed vertices.

For a better understanding of the present invention and in order to show how the same may be carried into effect reference will now be made, by way of example, to the accompanying drawings in which.

Figure 1:
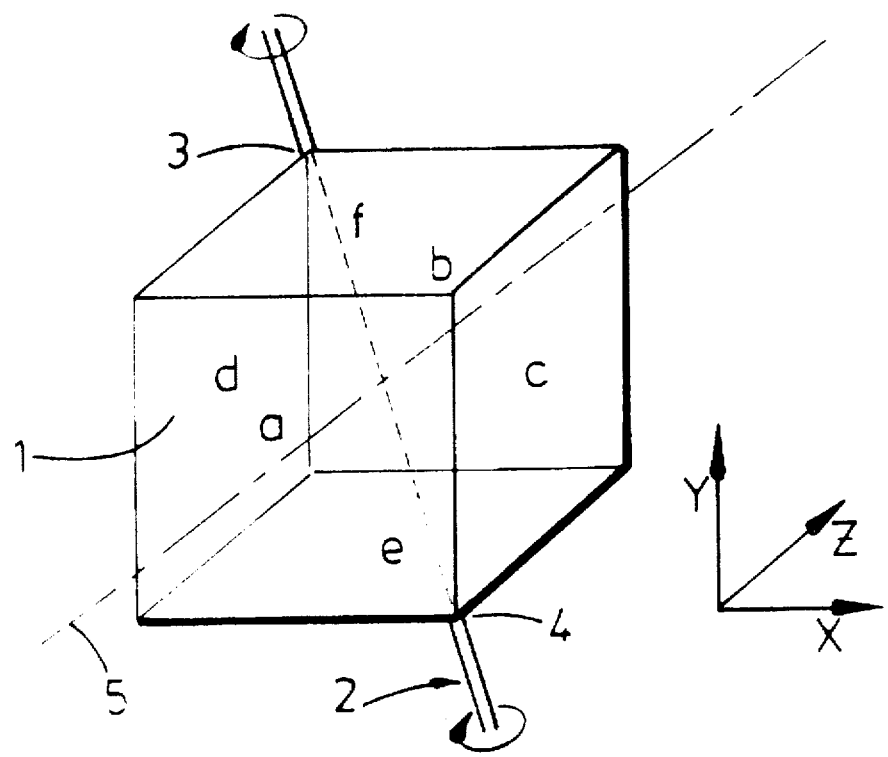
FIG. 1 illustrates the concept underlying a triple field of view change mechanism.

FIG. 1 illustrates the underlying concept behind a compact triple field of view change mechanism. A cube 1 (where the six faces of the cube are identified by the letters a to f shown at, or near, the face centres in FIG. 1) is mounted for rotation about an axis 2 which passes through its rear, upper, left corner 3 and its front, lower, right corner 4. A fixed optical axis 5 is defined by a line passing through the centres of both the front face a and the rear face b of the cube. In the configuration shown in FIG. 1, the fixed optical axis passes through the centres of faces a and b at right angles thereto.

If the cube is rotated about the rotation axis 2 by 120°, so that face c provides the front face and face d provides the rear face, the fixed optical axis 5 will pass through the centres of faces c and d. Similarly, if the cube is rotated by a further 120°, the fixed optical axis 5 will pass at right angles through the centres of faces e and f. With reference to the x, y, z co-ordinate axes (which represent three mutually orthogonal axes fixed relative to the cube) as shown in FIG. 1, any one of these three orthogonal axes may be aligned with the fixed optical axis 5 by an appropriate rotation about the rotation axis 2.

Figure 2:
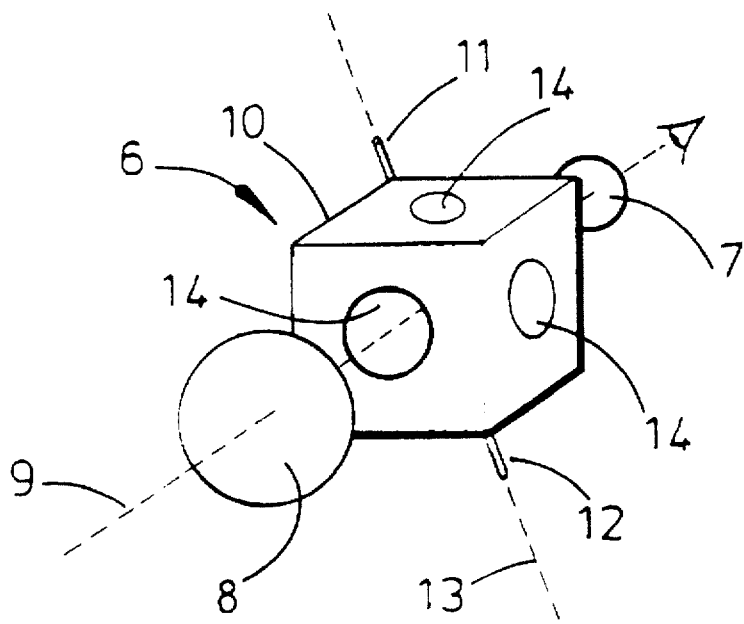
FIG. 2 shows a triple field of view change mechanism of an optical telescope.

Using the concept illustrated in FIG. 1, it is possible to position any one of three optical systems in line with a fixed optical axis. With reference to FIG. 2, there is shown a change of view telescope 6 comprising an eyepiece lens 7 and an objective lens 8, both of which are fixed relative to an optical axis 9 which passes through the centres of both lenses. Positioned between the eyepiece lens 7 and the objective lens 8 is a carousel 10 which is in the form of a cube mounted between a pair of supports 11, 12 attached to the upper, rear, left corner and the front, lower, right corner of the cube. These supports allow the cube to rotate about an axis 13 colinear with a diagonal of the cube and which makes an angle of 54.736° with the optical axis 9.

A lens 14 is mounted in each face of the cube. Each pair of lenses on opposed faces of the cube is arranged to provide a predetermined level of magnification when aligned with the optical axis 9. By rotating the carousel about the rotation axis 13, any one of the three lens pairs may be aligned with the optical axis allowing the selection of any one of three modes of operation.

Figure 3:
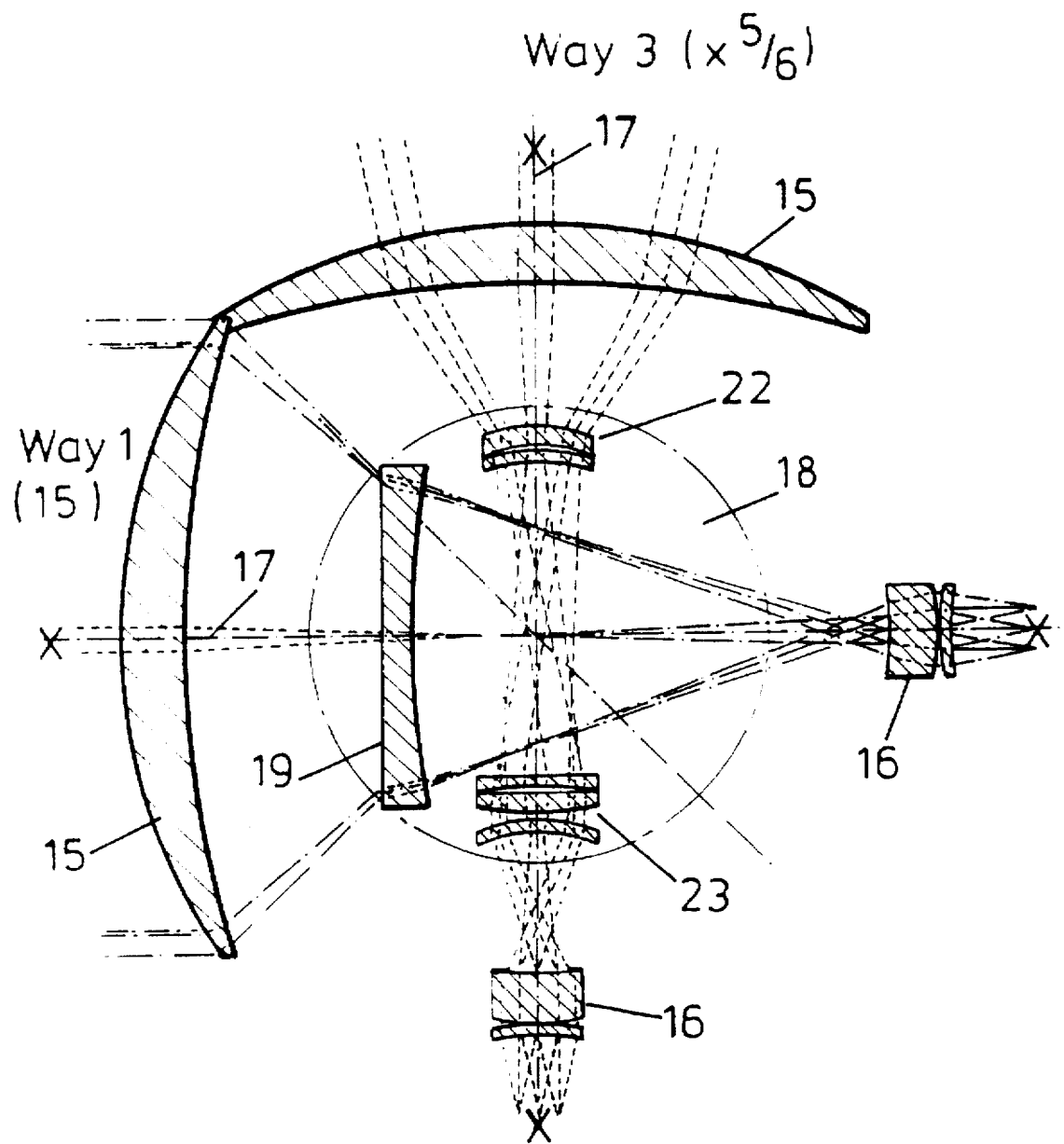
FIGS. 3 and 4 show in sectional detail the three field of views available with the sectional mechanism of FIG. 2.
Figure 4:
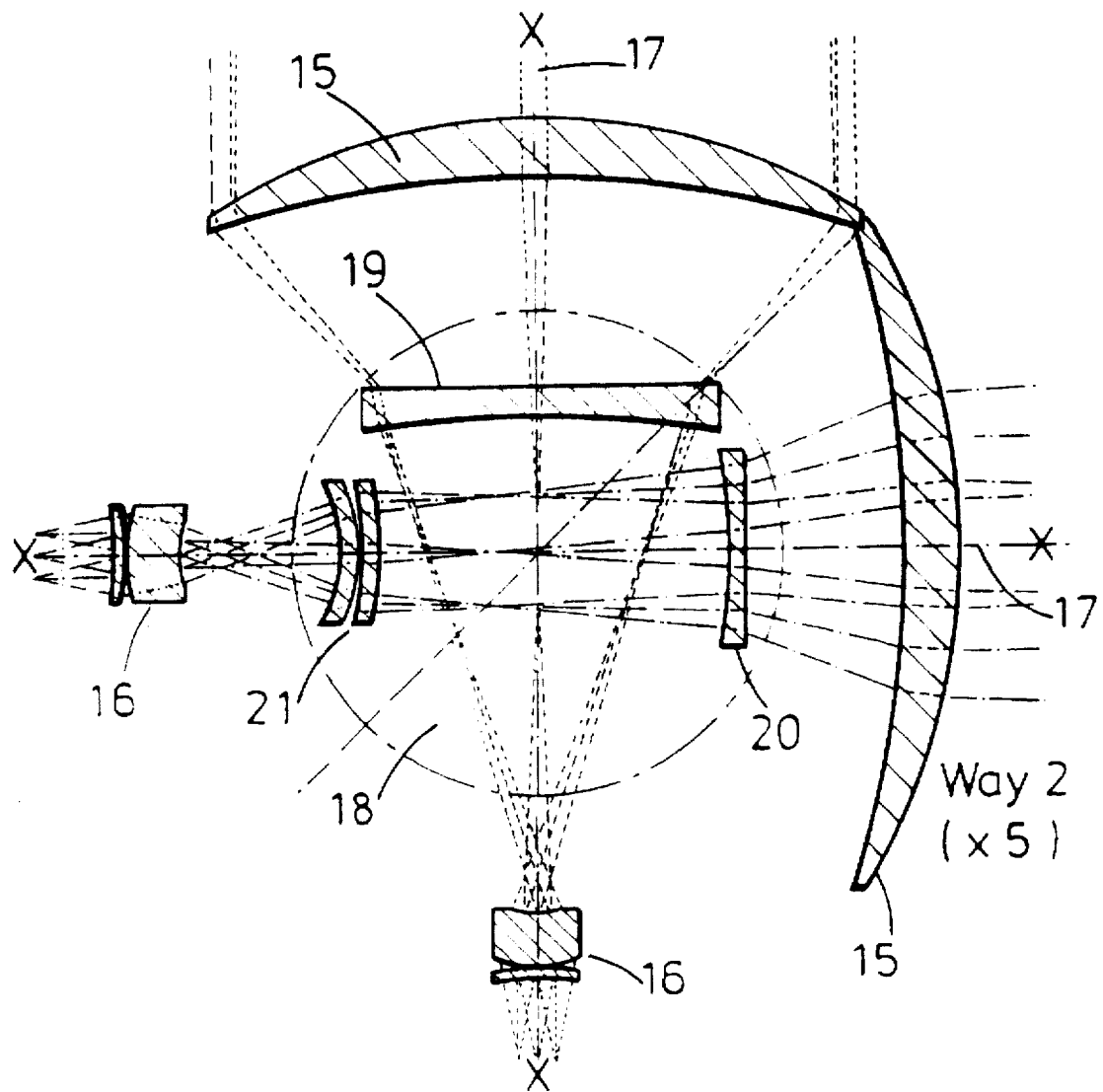

FIGS. 3 and 4 illustrate the case where the mechanism of FIG. 2 is arranged to provide x15, x5 and x5/6 magnification modes. In particular, FIG. 3 shows the ray diagrams for the x15 path (Way 1) and for the x5/6 path (Way 3) overlaid on one another whilst FIG. 4 shows overlaid ray diagrams for the x5 path (Way 2) and for the x15 path (Way 1). The two ray diagrams in each of FIGS. 3 and 4 are drawn at right angles to one another in order to illustrate that the carousel mounted optical components 19 to 23 comprising any one of the three ways do not interfere with the beams of any one of the other ways.

The 'fixed' components of the system of FIGS. 3 and 4 comprise an objective lens 15 and an eyepiece doublet 16 aligned with the main optical axis 17. The components shown within the shaded circle 18 at the centre of the diagram are mounted on the carousel for rotation about the rotation axis. The following table identifies the optical components with the reference numbers given in FIGS. 3 and 4 and indicates on which face of the cube, a to f (with reference to FIG. 1), they are mounted:

| Lens | Face |
| --- | --- |
| 19 | a |
| 20 | c |
| 21 | d |
| 22 | e |
| 23 | f |

It will be apparent from FIG. 2, and from FIGS. 3 and 4, that in order to allow the cube to freely rotate between the objective and the eyepiece lens the separation between the objective lens and the eyepiece lens need only be slightly greater than the length of a diagonal of the cube. The embodiment shown in FIGS. 2 to 4 therefore provides a very compact triple field of view telescope. It will also be appreciated that this carousel arrangement maximizes the size of an optical component which can be mounted between the objective lens and the eyepiece lens without interfering with the optical components aligned with another of the orthogonal axes. For example, a lens having a diameter equal to the length of a side of the cube may be used.

Figure 5:
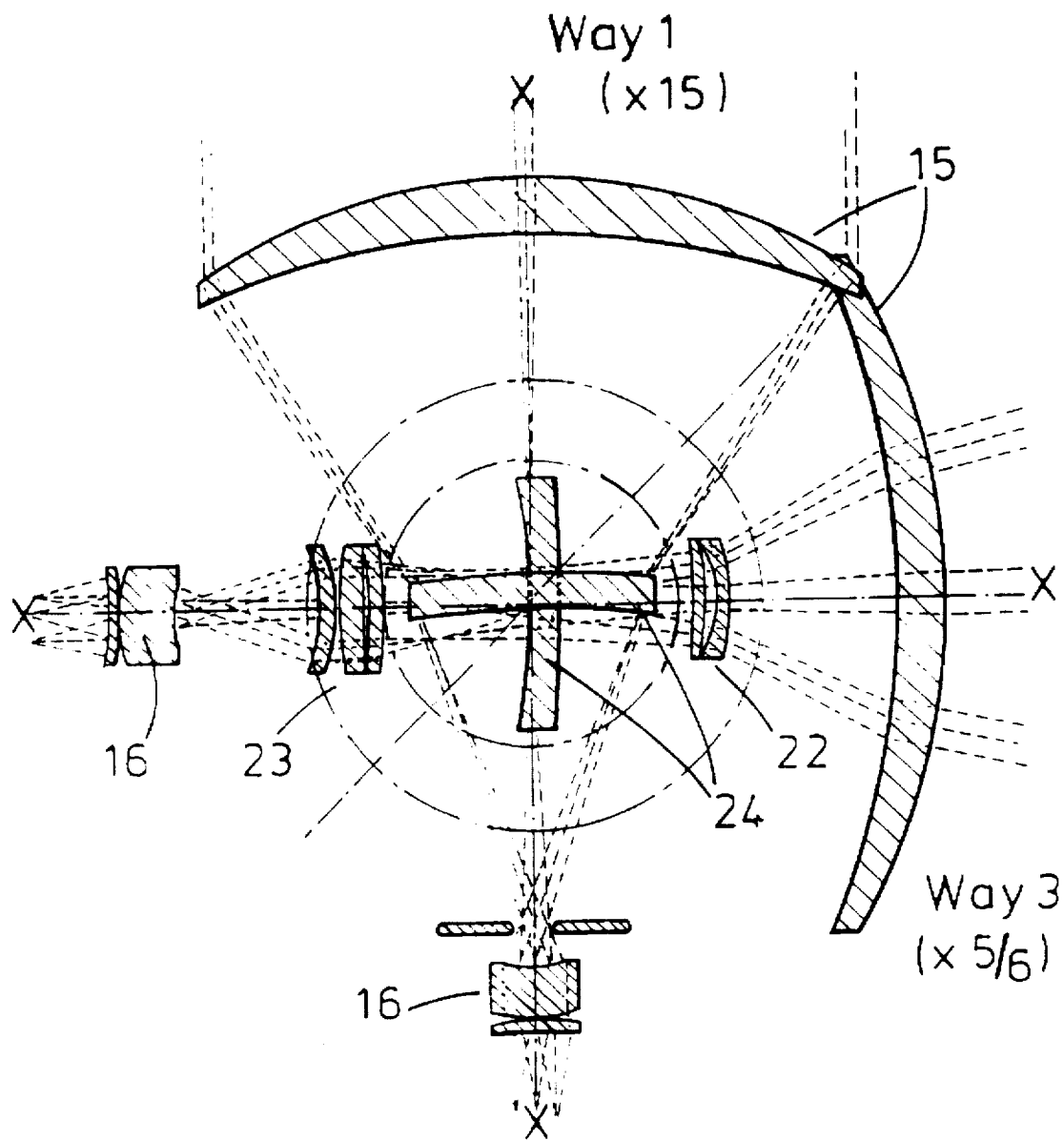
FIGS. 5 and 6 show in detail the three fields of view available from a second embodiment of the invention.
Figure 6:
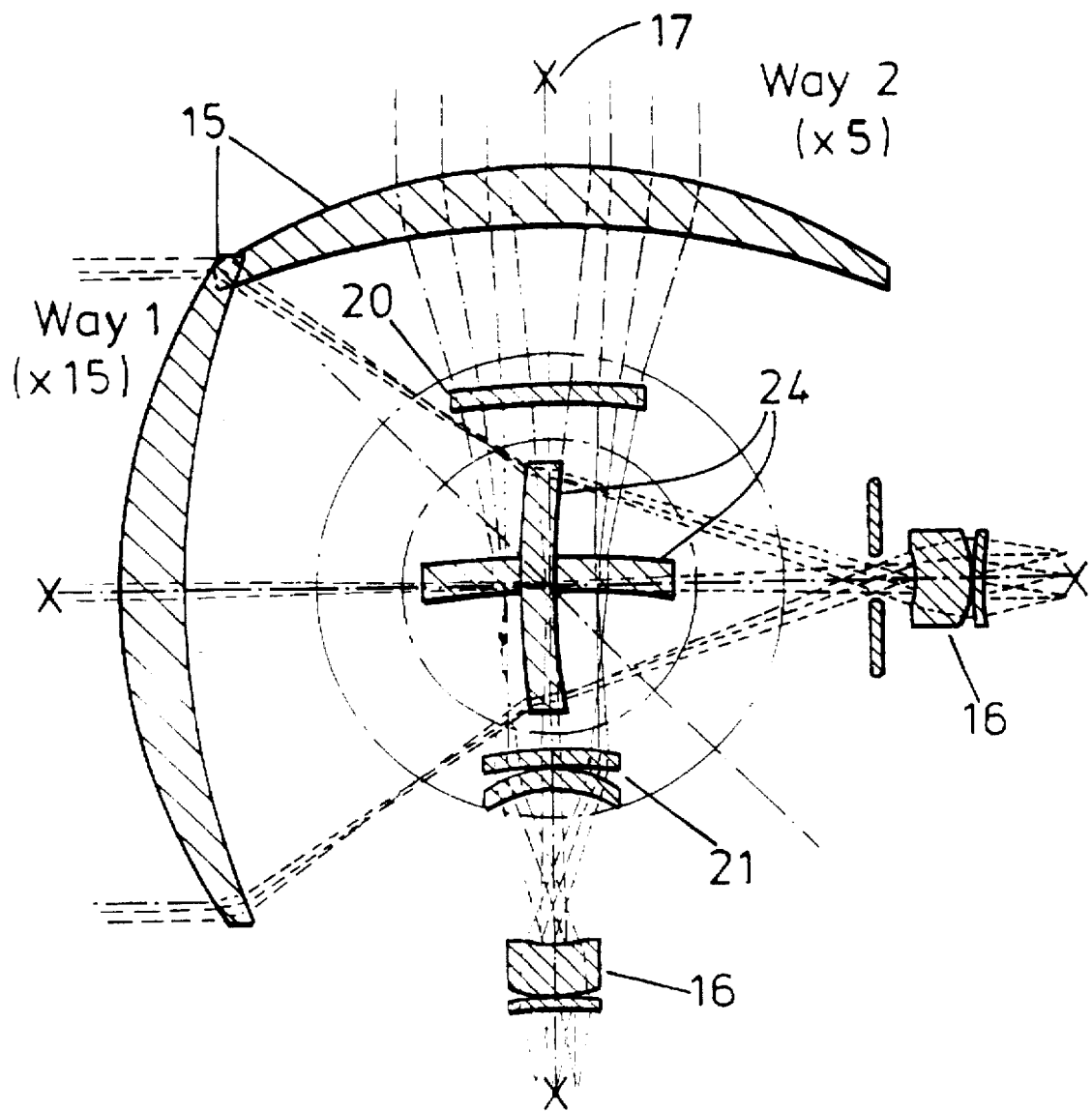

There is shown in FIGS. 5 and 6 a system having a lens 24 mounted within the carousel on the rotation axis mounting which passes along a diagonal of the carousel so that the lens 24 lies substantially in a plane perpendicular to the optical axis 17. The carousel (i.e. the components within the shaded ring) can therefore be rotated about the centre mounted lens 24 which remains fixed relative to the objective lens 15 and the eyepiece doublet 16. It will be noted that in the high magnification mode (Way 1) there are no carousel mounted components in the optical path. This arrangement helps to maintain boresight in the high magnification mode.

Figure 7:
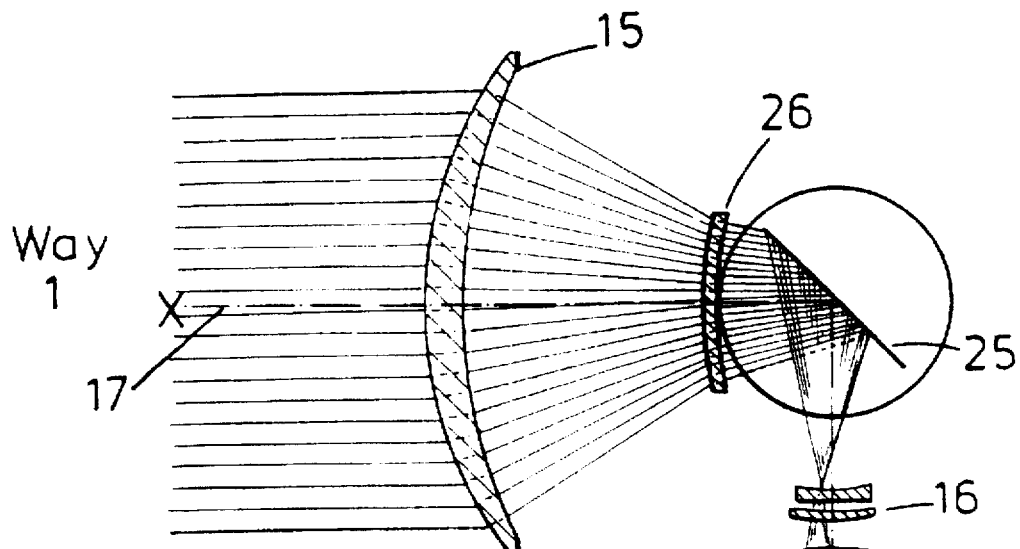
FIGS. 7 to 9 show the three fields of view obtainable with a third embodiment of the invention.
Figure 8:
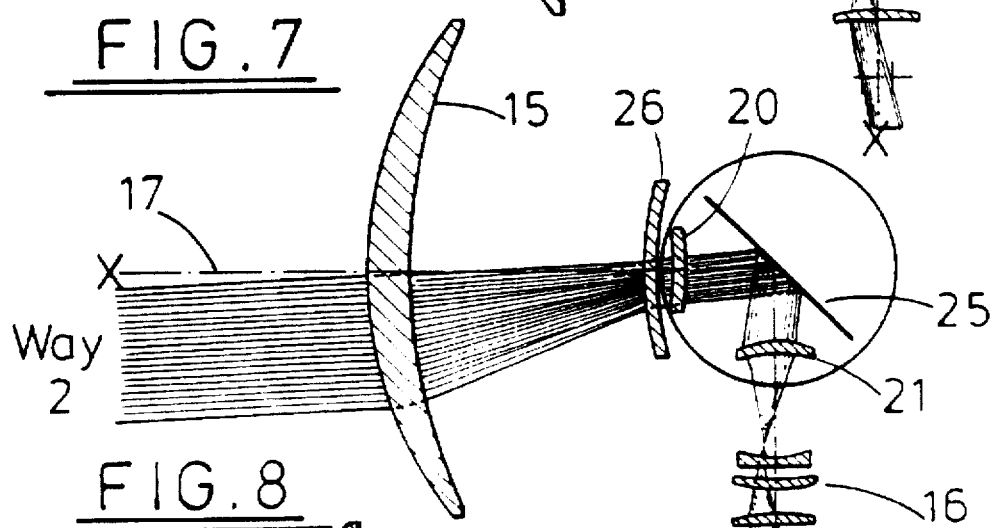
Figure 9:
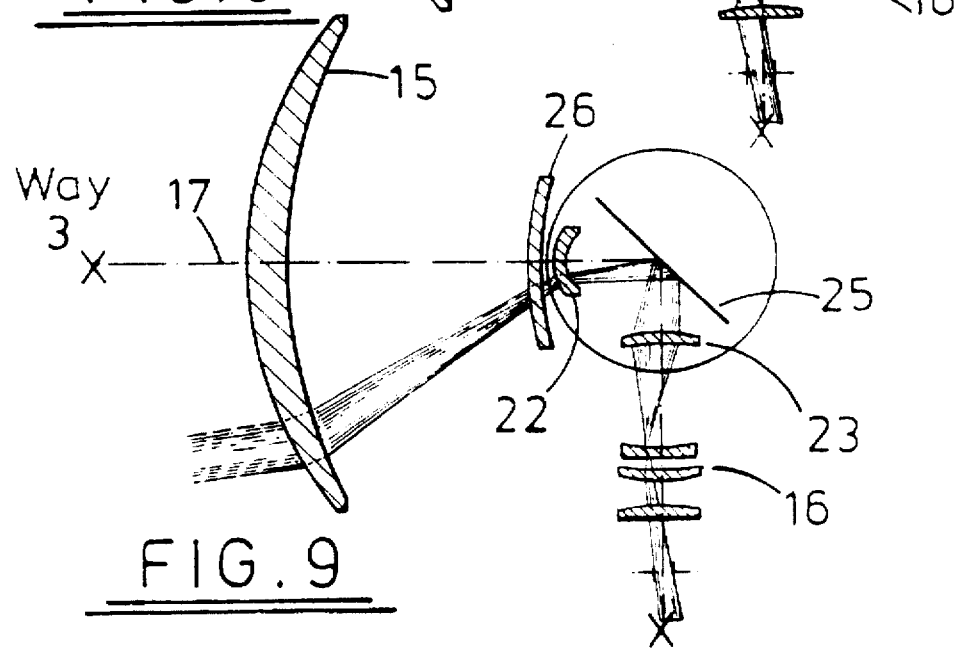

FIGS. 7 to 9 show a modification of the system of FIGS. 5 and 6 where the fixed centre mounted lens 24 is replaced by a fixed centre mounted planar mirror 25 arranged at an angle of 45 degrees to the optical axis. FIGS. 7 to 9 show respectively Way's 1 to 3 of the system. The system includes a secondary objective lens 26 fixed externally with respect to the main objective lens 15.

It will be apparent to the skilled person that various modifications may be made to the above described embodiments within the scope of the present invention. For example, the carousel may be used to mount optical components other than lenses, for example, polarizing filters or mirrors. The mechanism may also be used in optical systems other than telescopes.

It will be appreciated that the geometry of the carousel may deviate from that shown in FIGS. 1 and 2. For example, the carousel may be stretched or scaled, e.g. to have the form of a right angled parallelopiped or may be skewed. Alternatively, the carousel may have more than six faces, e.g. it may be an octahedron or a dodecahedron, enabling more than three field view changes to be obtained. The angle which the rotation axis makes with the optical axis may also differ from 54.736°. The angle will generally be determined by the carousel geometry but should be between 0° and 90°.

I claim:

1. A triple field of view change apparatus for use in an optical system having a fixed optical axis, the apparatus comprising a carousel which is rotatable about a single rotation axis which is inclined to the optical axis by an angle other than 0 degrees or 90 degrees, wherein the carousel is generally in the form of a cube, the center of the cube lying on the optical axis and being located at the origin of three orthogonal carousel axes passing through respective opposed pairs of faces of the cube, and a plurality of optical components mounted on the faces of the cube and aligned with the carousel axes, and wherein said single rotation axis is collinear with a diagonal of the cube whereby successive rotations of the cube by about 120° substantially aligns any one of the carousel axes with said optical axis.

2. Apparatus according to claim 1 and comprising at least one optical component fixed relative to the optical axis and contained within the carousel between opposed faces of the cube such that the carousel can be routed about the fixed optical component.

* * * * *